May 31, 1949.　　　T. J. ASHDOWN　　　2,471,921
SPRING LOADED COLLET CHUCKING ASSEMBLY
Filed April 25, 1946　　　　　　　　2 Sheets-Sheet 1
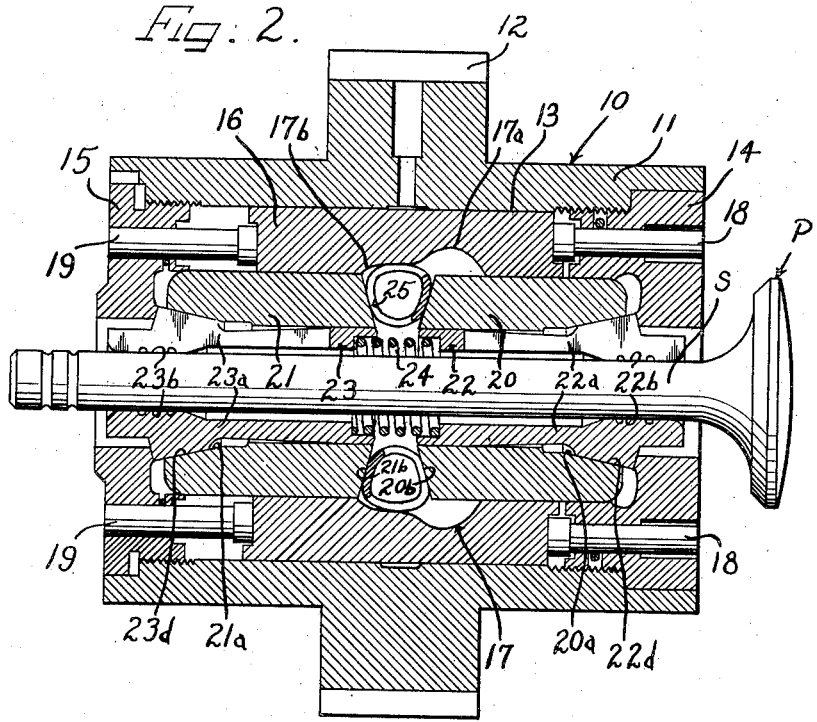
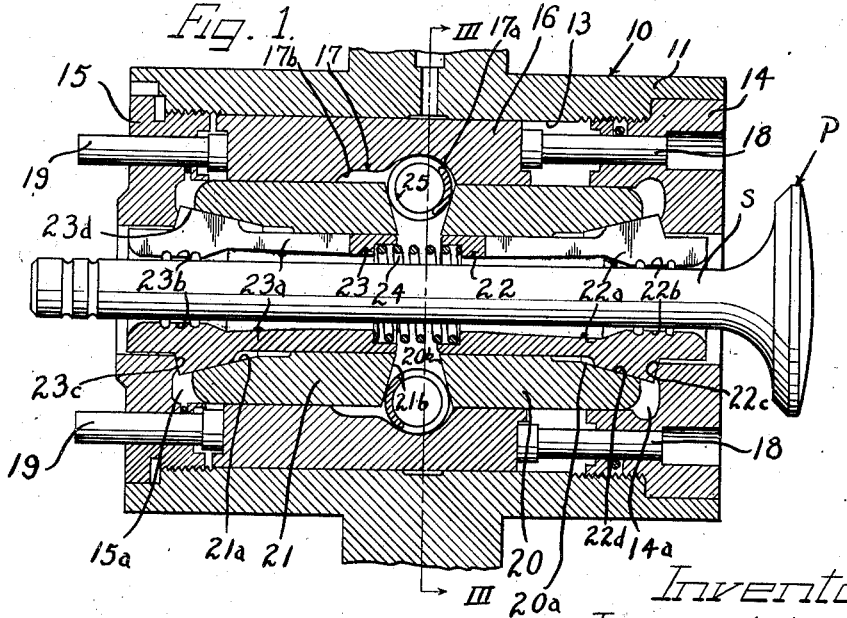
Inventor
THOMAS J. ASHDOWN.

May 31, 1949. T. J. ASHDOWN 2,471,921
SPRING LOADED COLLET CHUCKING ASSEMBLY
Filed April 25, 1946 2 Sheets-Sheet 2
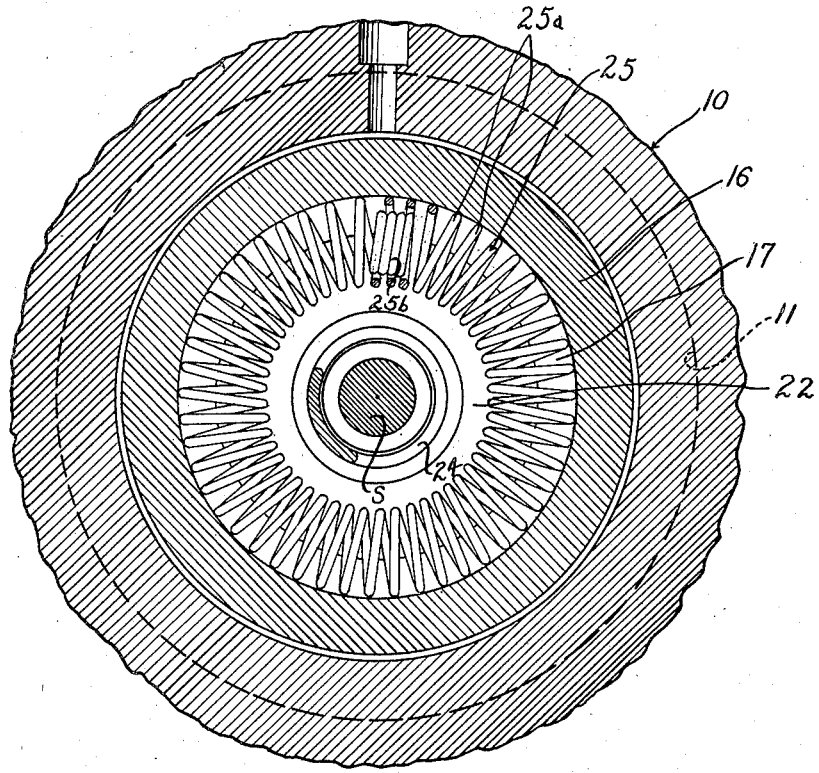
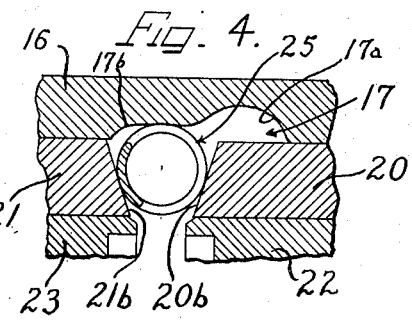
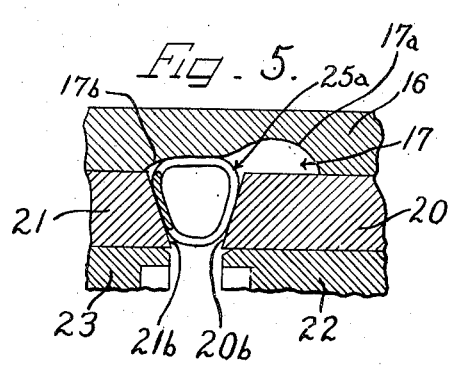
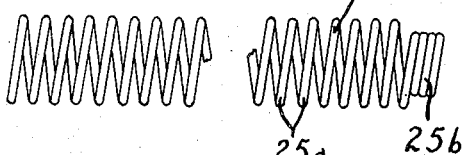
Inventor
THOMAS J. ASHDOWN.

Patented May 31, 1949

2,471,921

UNITED STATES PATENT OFFICE 2,471,921

SPRING LOADED COLLET CHUCKING ASSEMBLY

Thomas J. Ashdown, East Cleveland, Ohio, assignor to Thompson Products, Inc., Cleveland, Ohio, a corporation of Ohio Application April 25, 1946, Serial No. 664,897

6 Claims. (Cl. 279—50)

This invention deals with a collet assembly that is loaded by a spring in order to tightly grip a workpiece irrespective of variations in the size of the workpiece. Specifically this invention deals with a double collet arrangement loaded by an annular coiled spring which can be radially flattened or deformed to drive opposed collet sleeves into wedging engagement with the opposed collets to securely grip an inserted workpiece irrespective of wide tolerance variations in the workpiece.

This invention will hereinafter be specifically described in connection with a spring loaded collet chucking assembly for poppet valves but it should be understood that the principles of this invention are applicable to collets or gripping chucks in general.

In accordance with this invention opposed sets of collets are arranged for gripping a valve stem. Each set of collets is surrounded by a collet sleeve having a wedge-shaped mouth to engage all of the collets in each set and urge the same into gripping engagement with the valve stem. The collet sleeves have tapered inner end faces in spaced opposed relation and receive a coiled spring in the form of a ring therebetween. A pressure sleeve surrounds the collet sleeves and is slidable thereon. This pressure sleeve has a cam recess in its inner wall. The deeper portions of this recess are adapted to receive the collet spring without causing the spring to load the collet sleeves. When the pressure sleeve is shifted on the collet sleeves to move the shallow portions of the cam recess into position for receiving the collet spring, the spring is urged radially inward to act on the tapered end faces of the pressure sleeves thereby forcing the sleeves apart and into wedging engagement with the collets. This causes the collets to grip the inserted valve stem. In the event that the valve stem is oversize, the collet sleeves cannot be forced apart as much as when the valve stem is of normal size or is undersize. In such event the collet spring is radially flattened by the shallow cam recess of the pressure sleeve and the oversized valve stem can be accommodated. In the event that the valve stem is undersize, the collet spring may retain its original circular cross section but it will still be effective to act on the collet sleeves with sufficient force to actuate the collets into wedging engagement with the undersized valve stem. The arrangement is such that the collet spring is sized for slight radial deformation with normal sized valve stems and as the valve stems vary from this normal size the spring will be deformed more or less from normal deformation to carry out its function.

It is then an object of this invention to provide a spring loaded collet accommodating firm gripping of workpieces varying in size from a normal size.

A further object of this invention is to provide a double collet arrangement for gripping a workpiece wherein opposed collets are actuated by a coiled spring in the shape of a ring that can be deformed to accommodate oversize workpieces.

A specific object of this invention is to provide a chucking assembly with opposed sets of collets actuated by opposed wedge sleeves which sleeves in turn are actuated by an annular spring that is radially shifted by means of a cam shaped recess in a pressure sleeve.

A specific object of this invention is to provide a spring loaded double collet arrangement for firmly gripping workpieces such as valve stems irrespective of variations in the diameters of said workpieces.

Other and further objects of this invention will be apparent to those skilled in the art from the following detailed description of the annexed sheets of drawings which, by way of a preferred example only illustrate one embodiment of the invention.

On the drawings:

Figure 1 is a longitudinal cross sectional view, with parts in elevation, of a spring loaded collet chucking assembly according to this invention illustrating the assembly in opened position.

Figure 2 is a view similar to Fig. 1 but illustrating the assembly in closed or locked position.

Figure 3 is a transverse cross sectional view, with parts in elevation, taken along the line III—III of Fig. 1.

Figure 4 is a fragmentary longitudinal cross sectional view of a portion of the collet assembly of Figs. 1 to 3 illustrating the position of the collet spring when radially loaded to actuate the collets for gripping an undersized workpiece.

Figure 5 is a view similar to Fig. 4 but illustrating the position of the collet spring when radially loaded to actuate the collets for engaging an oversized workpiece.

Figure 6 is a side elevational view of the collet spring before its ends are brought together to form a ring.

As shown on the drawings:

In Figs. 1 to 3 the reference numeral 10 designates generally a double collet chucking assembly for tightly gripping the stem S of a poppet valve P. The assembly 10 includes a spindle or casing 11 that is rotatably mounted in a machine (not shown) and conveniently driven by means of a gear 12 formed thereon intermediate the ends thereof. The spindle 11 has a cylindrical bore 13 therethrough which is threaded and counterbored at its opposite ends. A stop end plate 14 is threaded into one end of the bore 13. An adjustable end plate 15 is threaded into the other end of the bore 13.

A pressure sleeve 16 is slidably mounted in the bore 13 between the end plates 14 and 15. This sleeve 16 has a cam-shaped recess 17 in the inner face thereof with a deep portion 17a and a shallow portion 17b. The stop end plate 14 slidably mounts a plurality of pins 18 which act on one end face of the pressure sleeve 16 to shift the sleeve to the left as viewed in Figs. 1 and 2. The adjustable end plate 15 slidably mounts a plurality of pins 19 to act on the other end face of the pressure sleeve 16 for shifting the sleeve to the right. This shifting of the sleeve changes the location of the shallow and deep portions of the cam recess 17 to control operation of the collets as will be hereinafter described. The pins 18 and 19 are selectively engaged by actuating spindle mechanism (not shown).

Opposed collet sleeves 20 and 21 are slidably mounted within the pressure sleeve 16. The sleeve 20 slidably projects into a recess 14a in the stop end plate 14. A similar recess 15a is provided in the adjustable end plate 15 for the sleeve 21.

A collet 22 is disposed in the collet sleeve 20 and is longitudinally slotted inwardly from its outer end to provide a plurality, such as three, gripping fingers 22a each having interior surfaces 22b near their outer ends for engaging the stem S.

The fingers 22a have external shoulders 22c on their outer ends bottomed against the stop end plate 14 within the recess 14a thereof.

The fingers also have tapered wedge faces 22d converging from the shoulders 22c into the tapered mouth 20a of the sleeve 20. Movement of the sleeve toward the stop plate 14 will thereby cause the tapered mouth 20a thereof to wedgingly engage the tapered portions 22d of the collet fingers 22a and urge the fingers radially inward so that their surfaces 22b will frictionally grip the valve stem S.

A similar collet 23 is provided in the sleeve 21. This collet 23 has a set of spring fingers 23a with interior stem gripping portions 23b, exterior shoulders 23c bottomed on the adjustable end plate 15 and tapered head portions 23d converging from the shoulders 23c and seated in the tapered mouth 21a of the sleeve 21.

A coiled spring 24 is interposed between the inner ends of the collets 22 and 23 and urges these collets toward the end plates 14 and 15 to be bottomed thereon. It will be noted that the shoulders 22c and 23c of the collets which are bottomed on the end plates 14 and 15 respectively are beveled so that radial movement of the collet fingers 22a effects slight axial shifting of the collet and flexing of the spring 24. The spring fingers 22a and 23a of the collets of course tend to move into the position shown in Fig. 1 due to the inherent springiness of the fingers. This outward springing of the finger slides the sleeves 20 and 21 toward each other.

The sleeves 20 and 21 have beveled inner end faces 20b and 21b respectively. These faces converge toward the inside of the sleeves.

In accordance with this invention a coiled spring 25 in the form of a ring is interposed between the sleeves 20 and 21 within the cam recess 17 of the pressure sleeve 16. As best shown in Figs. 3 and 6 the spring 25 is a cylindrically coiled spring preferably composed of music wire or the like and has coils 25a of a diameter to fit in the radially outer portion of the space between the collet actuating sleeves 20 and 21. These coils extend completely around the annular spring. The annular spring is formed from a longitudinal spring shown in Fig. 6 having several reduced diameter coils 25b at one end thereof. These reduced diameter coils 25b are inserted into the coils 25a at the other end of the spring as best shown in Fig. 3 to form the ring.

As best shown in Fig. 1 when the pins 18 push the pressure sleeve 16 to the left hand end of the spindle toward the adjustable end plate 15, the collet spring 25 is seated in the deep portion 17a of the cam recess 17 and the spring thereby expands radially into the outer ends of the wedge-shaped groove provided between the tapered or beveled end faces 20b and 21b of the collet sleeves 20 and 21 respectively. In this position the spring 25 does not act on the sleeves 20 and 21 and the inherent resiliency of the collet fingers 22a and 23a respectively slide the collet sleeves 20 and 21 toward each other thereby releasing the valve stem S.

As shown in Fig. 2 when the pins 19 push the pressure sleeve 16 to the right toward the stop end plate 14, the shallow portion 17b of the cam recess 17 receives the collet spring 25. This shallow recess portion radially loads the spring 25 to force it into the tapered groove provided by the end faces 20b and 21b of the sleeves 20 and 21. The sleeves in turn are forced apart to wedgingly engage the portions 22d and 23d of the collets 22 and 23 thereby springing the collet fingers 22a and 23a radially inward so that their surfaces 22b and 23b will grip the valve stem S and fixedly retain the poppet valve P in position. The position illustrated in Fig. 2 shows the deformation of the spring 25 when the valve stem S is of normal diameter. In this condition the sleeves 20 and 21 cannot move apart sufficiently to accommodate the full circular dimension of the coils 25a of the spring 25 because the surfaces 22b and 23b of the spring collet fingers engage the stem S before the spring 25 is fully seated in the shallow recess 17b. Therefore to accommodate full movement of the pressure sleeve 16 the spring 25 is radially flattened and its coils 25a are deformed substantially into the shape shown. The normal sized stem S is thereby securely gripped by the collet.

In the event that the diameter of the stem S is undersize, the spring collet arrangement of this invention will still tightly grip the undersize stem. In such event, as shown in Fig. 4, the pressure sleeve 16 when shifted to receive the spring 25 into the shallow portion 17b of its recess will not deform the coils of the spring because the spring can move inwardly along the end faces 20b and 21b of the sleeves 20 and 21 a sufficient distance to avoid deformation. This is made possible by the fact that the collet sleeves 20 and 21 move apart a sufficient distance to accommodate the full normal size coils 25 therebetween. At the same time however the sleeves 20 and 21 are moved to wedgingly engage the collets for radially deforming the collet fingers into tight gripping engagement with the undersize valve stem.

As shown in Fig. 5 when the valve stem is oversize the pressure sleeve 21 will accommodate the spring 25 in the shallow recess 17b thereof only by materially deforming the coils of the spring as shown. In this event the sleeves 20 and 21 cannot be moved far enough apart to accommodate the inward movement of the spring 25 along their tapered end walls 20b and 21b. As a result the spring coils must be materially deformed or flattened radially as indicated. However, the spring 25 will still be effective to force the sleeves 20 and 21 apart for closing the collets tightly against the oversize valve stem.

It will be readily appreciated that unless a deformable collet sleeve actuator is used, the pressure sleeve 16 could only be effective to operate the collets for engaging a normal sized valve stem and if the valve stem were undersized it would not be gripped by the collets whereas if it were oversize either the pressure sleeve or the spreader for the collet engaging sleeves would be damaged.

The spring loaded collets of this invention therefore carry out a function not capable of being performed heretofore in that a cam arrangement can be used to actuate the collets between open and closed positions and still accommodate variable sized workpieces.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A chuck assembly comprising a collet adapted to grip and release an inserted workpiece, a shiftable member arranged to move said collet into gripping position and to release said collet from gripping position, a spring device for shifting said member, and an actuator for loading said spring device to effect shifting of the member, said spring device adapted to absorb excess movement imparted thereto by said actuator for preventing damage to said shiftable member.

2. A chuck assembly comprising a collet, a sleeve embracing said collet for radially loading the collet into gripping relation with an inserted workpiece, said sleeve having a beveled end face, a collet spring in the shape of a ring bottomed on said beveled end face of the sleeve, and means for radially loading said spring to act on the beveled end face of the sleeve for shifting the sleeve to move the collet into gripping positions.

3. In combination a collet, a collet actuating sleeve embracing the collet, an annular coiled spring acting on said sleeve, and shiftable means for radially loading said coiled spring to cause the spring to urge the sleeve in a direction for closing the collet.

4. In combination in a chuck assembly, a collet, a collet actuating sleeve surrounding said collet, a pressure sleeve surrounding said collet actuating sleeve and slidable thereon, and a resilient member co-operating with said pressure sleeve to move said collet actuating sleeve for closing said collet, said pressure sleeve being movable into locking position for holding said collet actuating sleeve against backward movement regardless of variation in the size of work gripped by the collet.

5. In combination in a chuck assembly, a pair of opposed collets, pressure sleeves slidable on said collets and having opposed tapered end faces, said pressure sleeves having wedge-shaped mouths adapted to wedgingly-engage the collets for radially contracting the same, a single pressure sleeve surrounding both of said sleeves, a coil spring within said pressure sleeve between the tapered end faces of the collet sleeves, said pressure sleeve having a cam recess of variable depth for radially shifting said collet spring to spread said collet sleeves apart and thereby close the collet, and a body member having a central cylindrical aperture adapted to receive in guiding relation the single pressure sleeve and having a gear connection for rotating said chuck assembly.

6. In combination in a chucking assembly, a pair of opposed collets, pressure sleeves slidable on said collets and having opposed tapered end faces, said pressure sleeves having wedge-shaped mouths adapted to wedgingly-engage collets for radially contracting the same, a single pressure sleeve surrounding both of said sleeves, a coil spring within said pressure sleeve between the tapered end faces of the collet sleeves, said pressure sleeves having a cam recess of variable depth for radially shifting said coil spring to spread said collet sleeves apart and thereby close the collets, and a body member having a central cylindrical aperture adapted to receive in guiding relation said single pressure sleeve, a plate member disposed at either end in said central aperture, each plate member having a plurality of axially extending guide holes, and push rods disposed in said guide holes for moving said single pressure sleeve axially of said chucking assembly.

THOMAS J. ASHDOWN.

REFERENCES CITED

The following references are of record in the file of this patent:

UNITED STATES PATENTS

| Number | Name | Date |
|---|---|---|
| 1,316,709 | Gray | Sept. 23, 1919 |
| 1,862,856 | Johnson | June 14, 1932 |
| 2,062,628 | Yannetta | Dec. 1, 1936 |
| 2,063,718 | Berndt | Dec. 8, 1936 |
| 2,143,010 | Imblum | Jan. 10, 1939 |
| 2,310,259 | Ruppel | Feb. 9, 1943 |

FOREIGN PATENTS

| Number | Country | Date |
|---|---|---|
| 434,583 | Germany | Sept. 25, 1926 |
| 315,906 | Germany | Nov. 15, 1919 |